M. E. PROVOST.
MICROMETER GAGE.
APPLICATION FILED FEB. 11, 1915.
1,152,761.
Patented Sept. 7, 1915.
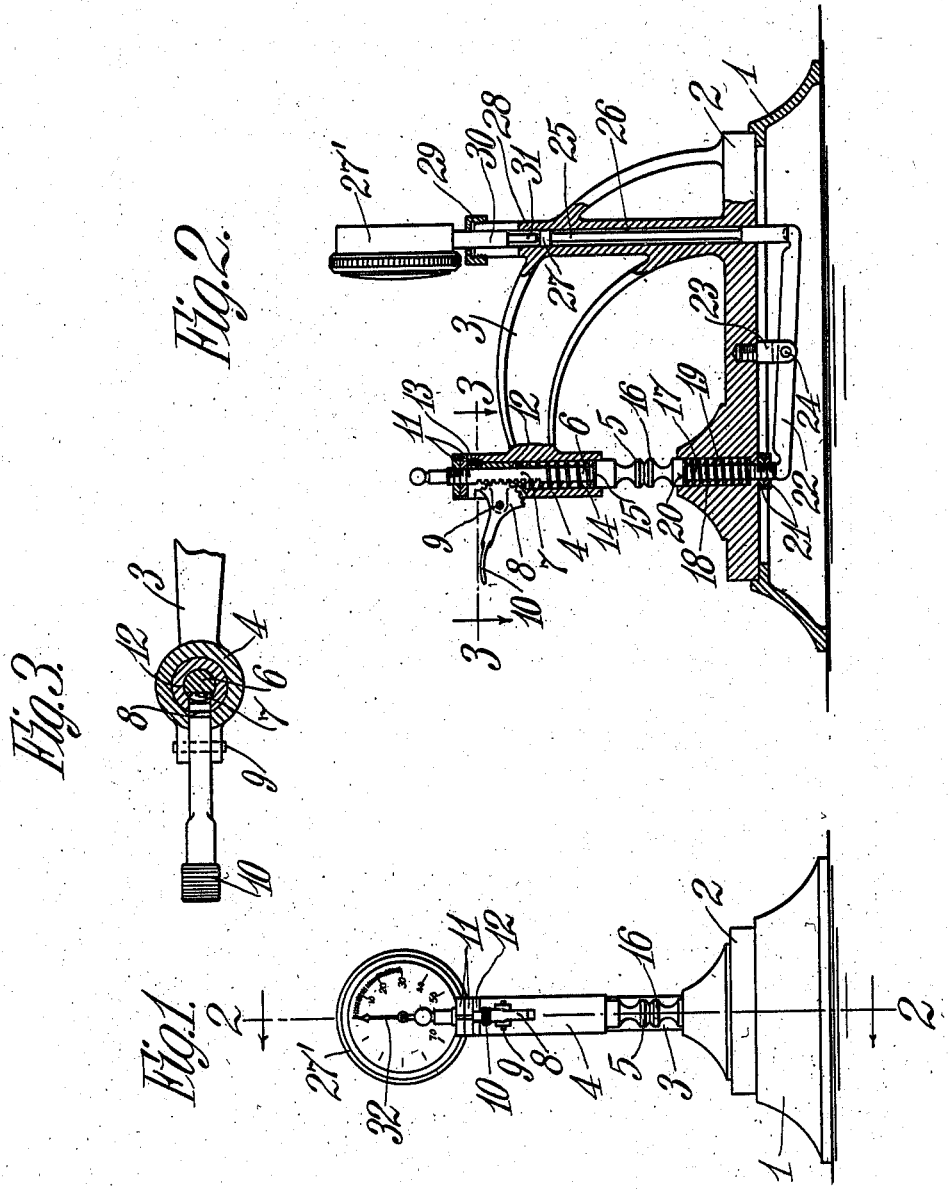
WITNESSES:
H. E. Hartwell
E. M. Potter
INVENTOR.
Milford E. Provost.
BY Chapin & Co.
ATTORNEYS

UNITED STATES PATENT OFFICE.

MILFORD E. PROVOST, OF HOLYOKE, MASSACHUSETTS.

MICROMETER-GAGE.

1,152,761.     Specification of Letters Patent.     Patented Sept. 7, 1915.

Application filed February 11, 1915. Serial No. 7,492.

*To all whom it may concern:*

Be it known that I, MILFORD E. PROVOST, a citizen of the United States of America, residing in the city of Holyoke, county of Hampden, and State of Massachusetts, have invented certain new and useful Improvements in Micrometer-Gages, of which the following is a specification.

This invention relates to improvements in micrometer gages.

The object of the invention is to provide a gage for measuring the thickness of paper particularly paper that is to be used for lithographing.

In instruments of this class, which are now in use, objection arises from the fact that the instrument will not measure the thickness of paper only over a small portion of its surfaces. It is a well known fact that paper that is to be used by lithographers should be of uniform thickness in order that the colors that are applied for printing the pictures may be uniformly distributed since if the paper is uneven the workmanship would be poor.

This invention, broadly, comprises a pair of anvils one of which is mounted in an overhanging arm and the other in the base or platform portion of the instrument. These anvils are designed to receive the paper therebetween and through suitable connections the micrometer gage is actuated, the pointer of which directly indicates the thickness of the paper in thousandths of an inch.

A further object of the invention is to provide a gage that can be quickly actuated by the operator for the insertion and removal of the paper being measured.

Referring to the drawings: Figure 1 is a front elevational view, showing the gage proper and with the anvils in contact with each other; Fig. 2 is a vertical sectional view taken in a plane on the line 2—2 of Fig. 1, looking in the direction of the arrows and illustrating the interior construction of the overhanging arm in which the upper anvil is mounted, the lever mechanism for elevating this anvil when the paper is to be inserted, also the connecting mechanism between the lower anvil and the micrometer gage; Fig. 3 is a horizontal sectional plan view on line 3—3 of Fig. 2, showing the interior construction of the mechanism which elevates the upper anvil.

Referring to the drawings in detail: 1 designates the base portion of the instruments upon which is placed the platform 2. This platform is provided with an integral overhanging arm 3. The outer end of this arm is formed with a boss or hub portion 4. Located in this hub, which is first bored out, is the upper anvil 5. This anvil is formed with a stem 6 which extends upward through the hub 4, as shown. One side of this stem is cut away and has formed thereon a rack 7. Engaging this rack is a toothed sector 8 which is pivotally connected to the hub 4 at the point 9 and has an outwardly extending anvil or handle portion 10. The upper end of the stem 6 is threaded to receive the adjusting nuts 11. Located within the hub 4 is a bushing 12 which is secured therein by means of the small threaded screw 13. The set nuts 11 are for the purpose of limiting the downward movement of the anvil 5. Since they engage the upper portion of the hub 4, as shown. Surrounding the lower portion of the stem 6 is a coil spring 14. One end of this spring bears against a shoulder portion 15 of the anvil 5 and its upper end against the lower edge of the sleeve or bushing 12.

Mounted in the platform 2 is the lower anvil 16 which is formed with a reduced stem portion 17 and surrounding this stem is a coiled spring 18 which is weaker than the spring 14. The lower end of the spring 18 rests at the bottom of the bored out socket 19 and its upper end against the shouldered portion 20 of the anvils 16. The lower end of the stem 17 is threaded to receive the set nuts 21. These nuts are designed to engage the lower side of the platform 2 and thus limit the upward movement of the anvil 16.

22 designates a lever which is pivotally mounted on the lower side of the platform 2 by means of the hanger bolt 23 at the point 24. The outer end of this lever engages the lower end of the stem 17 while the inner end of the lever 22 engages the lower end of a vertically disposed rod 25, which is mounted in an opening 26 which extends through the platform 2 and the arm 3. The upper end of this rod is formed with an enlarged hub 27, in order to accurately guide the movements of the rod 25 in the opening 26. The gage proper is shown at 27' and is attached to an upwardly extending boss 28 by means of the clamping collar 29 which acts as a clutch to grip the downwardly extending stem 30 of the gage.

31 is a slidable rod which passes through the stem 30 for operating the pointer 32 of the gage. There is nothing new or novel about the gage shown herein since it comprises the ordinary micrometer gage that is sold in the open market.

The operation of my gage may be described as follows, it being understood that the springs 14 and 18 acting in opposite directions moves the anvils 5 and 16 so that they contact with each other. In order to insert a sheet of paper the operator depresses the lever 10 causing the anvil 5 to be elevated against the tension of the spring 14. After the sheet of paper has been inserted he then releases the lever 10. This allows the stronger spring 14 to expand which causes the anvil 16 to be moved downward against the tension of the weaker spring. The anvil 5 will of course be moved downward until limited by the set nuts 11 again engaging the upper end of the hub 4, but since the spring 14 is stronger than the spring 18, the lever 22 will be depressed and the rod 25 elevated which in turn will actuate the pin 31 that moves the pointer 32 of the gage, thus enabling the operator to directly read the thickness of the paper in thousandths of an inch. It should be mentioned that the anvil 5 always descends to the same initial position and the anvil 16 is the only one that moves from its original position after the operator releases his hand from the handle 10.

What I claim is:

1. In a micrometer of the class described, the combination, of a platform member, of an arm secured thereto, a pair of anvils slidably mounted in the arm and platform, means for elevating the uppermost anvil, a gage operatively connected to the lower anvil, means for operating the lower anvil by the upper anvil, said means comprising two springs acting in opposite directions on the anvils, one spring actuating the upper anvil and the other spring actuating the lower anvil, the upper anvil actuating spring being stiffer than the lower anvil actuating spring, means for limiting the downward movement of the upper anvil, whereby the movement of the lower anvil will determine the thickness of the article to be measured, as described.

2. In a micrometer gage the combination, of a pair of movable anvils, means for moving the same in opposite directions toward each other into normal contacting relation, means for limiting the extent of movements of said anvils in opposite directions, a micrometer gage operatively connected with one of said anvils, a rack and pinion construction to move the other of the anvils, to permit the insertion of a sheet of paper, therebetween.

3. In a micrometer gage, the combination, a platform member, a lever pivotally attached thereto, an anvil slidably mounted in said member, means for limiting the extent of movement of said anvil, a micrometer gage operatively connected to said lever, an arm secured to said platform member and formed with a bored out hub portion, an anvil mounted in said hub, means for forcing said anvil in a downward direction toward the other anvil, means for limiting the extent of movement of said anvil, and means for elevating the said last mentioned anvil to permit the insertion of an article whose thickness is to be determined, said anvils being arranged in the same vertical line so as to engage each other, the means for forcing the upper anvil downward being stronger than the means for forcing the lower anvil upward, as described, whereby when a sheet of paper or other article is to be measured the lowermost anvil will be moved downwardly and the downward movement of the upper anvil will be limited, as described.

4. A micrometer gage comprising, in combination, a platform member, an arm integral therewith, a pair of vertically alined anvils normally in contact with each other, and located in the platform and arm, respectively, means to move the upper anvil downward, means to limit the downward movement of said anvil, means to move the lower anvil upward and means to limit the upward movement of the lower anvil, a gage proper, mechanism operatively connected to the lower anvil to operate the gage, means to separate the anvils to permit the insertion of the article to be measured, the operating means of the upper anvil being stronger than the operating means which causes the upward movement of the lower anvil, whereby only the lower anvil and the gage proper connected therewith, after the insertion of the article to be measured, will be actuated from the upper anvil, as described.

5. A micrometer gage, comprising, in combination, a pair of normally contacting anvils, means to separate the same to permit the insertion of an article whose thickness is to be measured, a coiled spring for each of the anvils to move each of the anvils toward the other into contacting relation, one of the springs being stronger than the other, a stop to limit the movement of the anvil which is moved by the stronger spring, a gage proper operatively connected to the other anvil, whereby when an article is inserted between the anvils only the anvil which is connected with the gage will be operated.

6. In a micrometer gage, the combination, a platform member, an arm connected thereto, a pair of oppositely disposed normally contacting anvils, one each of the pair being located in the platform member and arm respectively, a gage proper, said member and arm having an opening therethrough, a rod in said opening to operate the gage, a lever to operate the rod, said lever being operated from one of the anvils, spring means to operate one anvil from the other to operate the gage, means to limit the movement of each of the anvils in opposite directions, and manually operated means in the arm to elevate one of the anvils to permit the insertion of the article to be measured.

MILFORD E. PROVOST.

Witnesses:
HARRY W. BOWEN,
HENRY A. BOOTH.